United States Patent Office 3,256,186
Patented June 14, 1966

3,256,186
PROCESS FOR PRODUCING CARBONATED BASIC METAL COMPOSITIONS
Rudolph Greenwald, Cleveland, Ohio, assignor to The Lubrizol Corporation, Wickliffe, Ohio, a corporation of Ohio
No Drawing. Filed Feb. 13, 1963, Ser. No. 258,134
6 Claims. (Cl. 252—33)

This invention relates to oil-soluble, basic metal compositions and to a process for preparing such compositions. The compositions of this invention are suitable for use as detergents and especially as additives in lubricating compositions, paints, plastics, resins, asphalts and power-transmitting fluids.

Oil-soluble metal compositions such as metal salts of sulfonic acids are useful as additives in lubricating compositions to impart detergent properties and antiwear properties. Those which are basic are often preferred because of their ability to counteract the corrosiveness of acidic products formed by the degradation of lubricating oils. A particularly desirable class of basic metal compositions are the basic metal salts of sulfonic acids, carboxylic acids, or mixtures thereof in which the metal is present in substantially greater amounts than the organic acid radical.

A convenient method for preparing the basic metal compositions involves the reaction of an organic acid with an excess of an inorganic metal base. A major concern with respect to the commercial utility of such method is the efficient utilization of the starting materials, especially the organic acids and the inorganic metal base. Another concern is the convenience of the reaction conditions that are required for the process. Thus, a great deal of effort has been devoted to the development of improved methods for preparing basic metal compositions.

Accordingly, it is a principal object of this invention to provide a process for preparing basic metal compositions.

It is another object of this invention to provide novel compositions of matter.

It is another object of this invention to provide oil-soluble basic metal compositions.

It is further an object of this invention to provide a process for preparing additives useful in lubricating compositions.

It is also an object of this invention to provide additives for use in mineral lubricating compositions and fuels.

It is also an object of this invention to provide lubricating compositions.

These and other objects are attained in accodrance with this invention by providing a process for preparing oil-soluble, basic metal compositions comprising carbonating a mixture of (A) One equivalent of an acidic substance selected from the class consisting of oil-soluble sulfonic acids and carboxylic acids;
(B) At least about 0.1 equivalent of an alcohol per equivalent of (A);
(C) From about 0.1% to about 5% by weight of (A) of an inorganic halide selected from the class consisting of ammonium halides, alkali metal halides, and alkaline earth metal halides; and
(D) At least about 2 equivalents of an alkaline earth metal base per equivalent of (A)

at a temperature from about 25° C. to about the boiling point of said mixture.

COMPONENT (A)

The sulfonic acids useful in the above process should contain at least about 12 aliphatic carbon atoms per molecule in order to have sufficient oil-solublility. They include aliphatic and aromatic sulfonic acids. They are illustrated by petroleum sulfonic acids or the acids obtained by treating an alkylated aromatic hydrocarbon with a sulfonating agent, e.g., chlorosulfonic acid, sulfur trioxide, oleum, sulfuric acid, or a combination of sulfur dioxide and chlorine or oxygen. The sulfonic acids obtained by sulfonating the alkylated benzene, naphthalene, phenol, phenol sulfide, or diphenyl oxide having one or more (e.g., three) alkyl radicals each of which contains from about 12 to about 100 carbon atoms are especially useful.

The process is especially adapted to prepare basic metal compositons from bright stock sulfonic acids. Bright stock is the relatively viscous petroleum fraction obtained by dewaxing and treatment with, e.g., fuller's earth, of the distillation residue after the volatile petroleum fractions have been separated. It usually has a viscosity value of at least about 80 SUS (Saybolt Universal Seconds) at 210° F., more often from about 85 SUS to about 250 SUS at 210° F. Its molecular weight may range from about 500 to 2,000 or even greater. Sulfonic acids can be obtained by the treatment of bright stock with any of the above illustrated sulfonating agents.

Specific examples of the sulfonic acids are mahogany acid, mono-wax (eicosane)-substituted naphthalene sulfonic acid, dodecylbenzene sulfonic acid, didoecylbenzene sulfonic acid, dinonylbenzene sulfonic acid, octadecyl-diphenyl ether sulfonic acid, octadecyl-diphenylamine sulfonic acid, ethyl-chlorobenzene sulfonic acid, bis-cetylphenyl disulfide sulfonic acid, cetoxy-caprylbenzene sulfonic acid, dilauryl-beta-naphthalene sulfonic acid, the sulfonic acid derived by the treatment of polyisobutene having a molecular weight of 1,500 with chlorosulfonic acid, nitronaphthalene sulfonic acid, paraffin wax sulfonic acid, bright stock (molecular weight 750) sulfonic acid, bright stock (molecular weight 2,000 sulfonic acid, bright stock (molecular weight 500) sulfonic acid, cetylcyclopentane sulfonic acid, and polyethylene (molecular weight of 750) sulfonic acid, etc.

The carboxylic acids likewise may be aliphatic or aromatic acids. They are exemplified by palmitic acid, stearic acid, myristic acid, oleic acid, linoleic acid, behenic acid, hexatriacontanoic acid, tetrapropylene-substituted glutaric acid, polyisobutene (molecular weight of 5,000)-substituted succinic acid, polypropylene (molecular weight of 10,000)-substituted succinic acid, octadecyl-substituted adipic acid, chlorostearic acid, 9-methylstearic acid, dichlorostearic acid, stearylbenzoic acid, poly-wax(eicosane)-substituted naphthoic acid, dilauryl-decahydronaphthylene carboxylic acid, didodecyltetralin carboxylic acid, dioctyl-cyclohexane carboxylic acid, and the anhydrides of such acids.

Mixtures of sulfonic and carboxylic acids likewise are contemplated for use in the above process. Those containing the two types of acids in relative proportions within the range of ratios of equivalents from about 1:2 to about 2:1 are especially desirable.

COMPONENT (B)

This component is a promoting agent, i.e., one which facilitates the incorporation of metal into the basic metal compositions. The alcohols useful as this component preferably contain up to about 30 carbon atoms. They may be monohydric or polyhydric alcohols. Specific examples of the alcohols include methanol, ethanol, isopropanol, cyclohexanol, dodecanol, decanol, behenyl alcohol, ethylene glycol, diethylene glycol, triethylene glycol, mono-methylether of ethylene glycol, trimethylene glycol, hexamethylene glycol, glycerol, pentaerythritol, benzyl alcohol, penylethyl alcohol, sorbitol, nitropropanol, chloroethanol, amino-ethanol, cinnamyl alcohol, allyl alcohol, and the like. Especially useful are the monohydric alcohols having up to about 10 carbon atoms and mixtures of methanol with a higher monohydric alcohol in weight ratios from about 1:10 to 10:1.

At least about 0.1 equivalent of this component per equivalent of (A) should be used in this process. Although there does not appear to be an upper limit of the concentration of this component in the process mixture, an amount greater than about 30 equivalents per equivalent of (A) does not seem to have any additional beneficial effects.

COMPONENT (C)

This component likewise functions to help the efficient utilization of the sulfonic acid reactant and the alkaline earth metal base reactant. It is a halide such as ammonium chloride, ammonium bromide, ammonium iodide, sodium chloride, sodium bromide, sodium iodide, potassium bromide, potassium iodide, calcium chloride, barium chloride, and calcium bromide. Of these, ammonium chloride, sodium chloride, barium chloride, and calcium chloride are especially effective.

These halides, for the most part, are soluble in water. It is often convenient to introduce this component to the process mixture in the form of an aqueous solution or a slurry. Hydrates of such halides are also useful.

As little as about 0.1% (based on the weight of (A)) of this component is sufficient to bring about the desired effects of this invention. Ordinarily, no more than about 5% of this component is required. The preferred amount to be used in this process is from about 0.5% to about 2%, again based on the weight of (A).

COMPONENT (D)

The alkaline earth metal bases useful as this component include for the most part the oxides, hydroxides, bicarbonates, sulfides, mercaptides, hydrides, alcoholates, and phenates of calcium, magnesium, barium and strontium. Calcium oxide and calcium hydroxide are preferred.

At least two equivalents of the alkaline earth metal base per equivalent of the sulfuric acid of (A) is to be used in the above process so that the product is basic. For the sake of convenience the basicity is indicated in terms of the "metal ratio" of the product, which is the ratio of the total chemical equivalents of the metal in the product to the chemical equivalents of the metal which is in the form of a metal salt, i.e., a neutral salt of the sulfonic acid. To illustrate, a metal salt containing five equivalents of the metal per equivalent of the acid radical has a metal ratio of five and a neutral metal salt has a metal ratio of one.

The formation of the basic metal compositions of this invention is effected by carbonating a mixture of the above-illustrated components, preferably in a fluid solvent such as a hydrocarbon oil, at a temperature from about 25° C. to about the boiling point of the mixture. Ordinarily, the carbonation temperature is below about 100° C. The presence of a small amount, e.g., up to 10% by weight, of water in the carbonation mixture is often advantageous to prevent excessive thickening of the mixture. The water may be added to the mixture or formed in situ as in the neutralization of the organic acid with a metal base. Carbonation may be accomplished simply by introducing carbon dioxide into the reaction mixture. After carbonation, the alcoholic promoting agent, if it is a volatile substance, may be removed from the product by distillation. If it is a non-volatile substance it may be allowed to remain in the product. Also if water is used or formed in the reaction it may be separated from the product by distillation or evaporation.

Upon mixing the components before carbonation, the sulfonic acid forms a metal salt with the alkaline earth metal base so that the mixture contains a metal salt of the acid and a large excess of the metal base. Such a mixture ordinarily is heterogeneous primarily because of the presence of the large excess of the insoluble metal base. As carbonation proceeds the metal base becomes solubilized in the organic phase and the carbonated product eventually becomes a homogeneous composition containing an unusually large amount of metal. The mechanism of the formation of the homogeneous product is not fully understood. It is believed, however, that carbonation converts the excess metal base to a carbonate or bicarbonate which forms with the metal salt of the sulfonic acid a homogeneous complex. The complex is readily soluble in hydrocarbon solvents such as benzene, xylene, or mineral oil. However, it is not always necessary for all of the metal base present in the process mixture to be so converted by carbonation in order to produce a soluble homogeneous product. In many instances a homogeneous product is obtained when as little as 75% of the excess metal base is carbonated. For the sake of convenient reference in the specification and the claims of this invention, the term "basic metal composition" designates the homogeneous, carbonated product without the specific reference to the degree of conversion of the excess metal base by carbonation.

The carbonation may also be carried out in other solvents such as n-hexane, naphtha, decane, dodecane, benzene, toluene, xylene diphenylether, chlorobenzene, or any other fluid inert solvent.

The following examples illustrate the preparation of the basic metal compositions of this invention:

*Example 1*

A mixture of 1,360 grams of a mineral oil solution containing 550 grams (1 equivalent or 0.5 mole) of a neutral calcium bright stock sulfonate. 300 grams of toluene, 100 grams of methyl alcohol, 100 grams of iso-octyl alcohol, and 260 grams (7 equivalents) of calcium hydroxide is carbonated at 35°–47° C. until carbon dioxide is no longer absorbed by the reaction mixture. To this mixture there is added 10 grams of a 15% aqueous sodium hydroxide together with 10 grams of ammonium chloride dissolved in 20 grams of water. The resulting mixture is carbonated at 62° C. until its base number (phenolphthalein indicator) is reduced to 32. The mixture is filtered and the filtrate is heated at 160° C./15 mm. to remove volatile components. The residue is a concentrate of a carbonated basic colcium bright stock sulfonate having a calcium sulfate ash content of 18% and a metal ratio of 3.9.

*Example 2*

A carbonated basic calcium sulfonate is prepared by introducing carbon dioxide to a mixture of 700 grams (0.5 equivalent) of a 40% oil solution of neutral calcium bright stock sulfonate having a molecular weight of 1,100, 900 grams mineral oil, 296 grams (8 equivalents) of calcium hydroxide, 100 grams of methyl alcohol, 75 grams of iso-octyl alcohol, 2.5 grams of water and 2.5 grams of calcium chloride. The carbonation is continued at 50°–58° C. until the mixture has the base number of 43 (phenolphthalein indicator). The mixture is then heated at 150° C. to distill off all volatile components. The residue is filtered and the filtrate has a calcium sulfate ash content of 19.7% and a metal ratio of 10.7.

*Example 3*

A carbonated basic calcium sulfonate is prepared by the procedure substantially the same as is described in Example 2 except that the ratio of equivalents of calcium hydroxide to the neutral calcium bright stock sulfonate is 15.5:1 and that the calcium hydroxide is added to the reaction mixture in four increments, each increment being followed by a carbonation step. The filtered product has a calcium sulfate ash content of 27% and a metal ratio of 16.

Example 4

The carbonated, metal salt of Example 3 is converted to a metal salt having a higher metal ratio as follows: the carbonated basic metal salt of Example 3, 150 parts of methyl alcohol, 150 parts of octyl alcohol, 6 parts of calcium chloride and 6 parts of water there is added 550 parts of lime (77% purity) in four portions, each addition being followed by carbonation at 47° C.–52° C. The carbonated product is then heated at 155° C./16 mm. to distill off volatile components and the residue is filtered. The filtrate has a calcium sulfate ash content of 44.8% and a metal ratio of 31.6.

Example 5

A carbonated basic metal salt is prepared by introducing carbon dioxide into a mixture of 350 parts (by weight) of the oil solution of neutral calcium bright stock sulfonate described in Example 1, 73 parts of distilled tall oil acid having an acid number of 195 (1 equivalent per equivalent of the sulfonate used), 900 parts of mineral oil, 100 parts of methyl alcohol, 75 parts of octyl alcohol, 2 parts of calcium chloride and 400 parts (11 equivalents) of calcium hydroxide. The carbonation is carried out at 40°–52° C. until the mixture no longer absorbs carbon dioxide. The carbonated mixture is then heated at 150°–160° C. and the residue is filtered. The filtrate is a 50% oil solution of a carbonated basic calcium salt of a mixture of bright stock sulfonic acid and tall oil acid and has a calcium sulfate ash content of 17.9% and a metal ratio of 8.2.

Example 6

A mixture of 360 parts of the oil solution of the neutral calcium bright stock sulfonate described in Example 1, 40 parts of distilled tall oil acid having an acid number of 195, 800 parts of mineral oil, 90 parts of methyl alcohol, 45 parts of octyl alcohol, 45 parts of toluene, 2 parts of calcium chloride, and 370 parts of calcium hydroxide is carbonated at 48°–65° C. until the base number of the mixture is reduced to 28. The carbonated mixture is heated at 150°–160° C./15 mm. and the residue filtered. The residue is a 47% oil solution of a carbonated basic calcium salt having a calcium sulfate ash content of 30% and a metal ratio of 17.5.

Example 7

A carbonated basic calcium salt is prepared by a procedure similar to that of Example 6 except that 300 parts of the oil solution of the neutral calcium bright stock sulfonate is used and that 100 parts of naphthenic acid having an acid number of 250 is used in place of the distilled tall oil acid. The resulting product is a 50% oil solution of a carbonated basic calcium salt of a mixture of bright stock sulfonic acid and naphthenic acid and has a calcium sulfate ash content of 32.4% and a metal ratio of 12.2.

Example 8

A mixture of 1,400 parts of the mineral oil solution of the neutral calcium bright stock sulfonate of Example 1 (1 equivalent), 1,800 parts of mineral oil, 740 parts (20 equivalents) of calcium hydroxide, 200 parts of methyl alcohol, 1,500 parts of iso-octyl alcohol, 10 parts of a 50% aqueous calcium chloride, is carbonated at 46°–65° C. until the mixture has a base number of 51. The mixture is then heated under vacuum to distill off volatile components and the residue is filtered. The filtrate (2,550 parts, 60.5% of the theoretical yield) is a 56% oil solution of a carbonated basic calcium salt having a calcium sulfate ash content of 25.2% and a metal ratio of 14.3.

The importance of an inorganic halide of component (C) in the above process of this invention is demonstrated by a comparison of the product of Example 8 with another product prepared by the procedure identical to that of Example 8 except that calcium chloride has been omitted from the process mixture. The latter product is found to have a calcium sulfate ash content of only 11.2% and a metal ratio of only 5.9 and is obtained in 28.6% of the theoretical yield. Thus it is apparent that component (C) is an essential element in the process of this invention for improving the yield of the product and also for facilitating the incorporation of a large amount of the metal base in the product.

The metal compositions of this invention are useful as detergents, especially as detergent additives in gasolines, burner fuel oils, greases, cutting oils, transformer oils, power transmitting fluids, and lubricating oils. When used as such additives the concentration of the metal compositions in the final compositions may range from as low as 0.0001% to as much as 30% by weight. More particularly, gasolines and fuel oils usually contain from about 0.001% to about 0.5% by weight of the additive whereas greases, power transmitting fluids, and lubricating oils may contain as much as 0.05%–10% by weight of the additive. A specific example of the utility of the metal compositions of this invention is a light catalytically cracked petroleum fuel oil (No. 2 grade) containing 0.05% by weight of the product of Example 5. Another example is a lubricating composition comprising SAE 20 mineral lubricating oil to which there has been added 0.75% by weight of the product of Example 1.

The efficacies of the carbonated basic metal salts of this invention as lubricant additives are further demonstrated by engine tests. One engine test is the CRC–L–1 test in which the lubricating composition is used in the crankcase of a 4-stroke diesel engine having a compression ratio of 15:1 and operated for 480 hours under the following conditions: speed, 100 r.p.m.; B.t.u. input per minute, 2,900–3,000; load, 20 brake horse-power; water jacket outlet temperature, 175–180° F.; and oil temperature, 140–150° F. A diesel fuel having a sulfur content of 1% is used and the oil is changed after every 120 hours of operation. The lubricating composition is evaluated in terms of (1) the piston cleanliness, on a rating scale of 0–100, 100 being indicative of no deposits and 0 being indicative of heavy deposits and (2) the amount of ring filling. By this test a SAE 30 mineral lubricating composition containing 1.59% (by volume) of the concentrate of the carbonated, basic metal salts prepared as is described in Example 3 gives the following results: ring filling, 3%; and piston cleanliness rating, 97.5.

What is claimed is:

1. A process for preparing oil-soluble, basic metal compositions comprising carbonating a mixture of:
   (A) one equivalent of an acidic substance selected from the class consisting of oil soluble sulfonic acids and carboxylic acids;
   (B) at least about 0.1 equivalent of an alcohol;
   (C) from about 0.1% to about 5% by weight of (A) of an inorganic halide selected from the class consisting of ammonium halides, alkali metal halides, and alkaline earth metal halides; and
   (D) at least about two equivalents of an alkaline earth metal base at a temperature from above about 25° C. to the boiling point of said mixture.

2. A process for preparing oil-soluble, basic metal compositions comprising carbonating a mixture of:
   (A) one equivalent of a mahogany sulfonic acid;
   (B) from about 0.1 to about 10 equivalents of an alcohol;
   (C) from about 0.1% to about 5% by weight of (A) of calcium chloride; and
   (D) at least about two equivalents of calcium hydroxide at a temperature from above about 25° C. to the boiling point of said mixture.

3. A process for preparing oil-soluble, basic metal compositions comprising carbonating a mixture of:
   (A) one equivalent of a bright stock sulfonic acid;

(B) from about 0.1 to about 10 equivalent of an alcohol;
(C) from about 0.1% to about 5% by weight of (A) of calcium chloride; and
(D) at least about two equivalents of calcium hydroxide at a temperature from above about 25° C. to the boiling point of said mixture.

4. A process for preparing oil-soluble, basic metal compositions comprising carbonating a mixture of:
(A) one equivalent of an alkylated aromatic sulfonic acid;
(B) from about 0.1 to about 10 equivalents of an alcohol;
(C) from about 0.1% to about 5% by weight of (A) of calcium chloride; and
(D) at least about two equivalents of calcium hydroxide at a temperature from above about 25° C. to the boiling point of said mixture.

5. A process for preparing oil-soluble, basic metal compositions comprising carbonating a mixture of:
(A) one equivalent of a bright stock sulfonic acid;
(B) from about 0.1 to about 10 equivalents of a mixture of an alcohol having less than about 5 carbon atoms and an alcohol having from 6 to about 30 carbon atoms;
(C) from about 0.1% to about 5% by weight of (A) of calcium chloride; and
(D) at least about 5 equivalents of calcium hydroxide at a temperature from above about 25° C. to the boiling point of said mixture.

6. A process for preparing oil-soluble, basic metal compositions comprising carbonating a mixture of:
(A) one equivalent of a bright stock sulfonic acid;
(B) from about 1 to about 10 equivalents of a mixture consisting of from about 10% to about 90% of methanol and from about 10% to about 90% of octyl alcohol;
(C) from about 0.1% to about 5% by weight of (A) of calcium chloride; and
(D) from about 5 to about 20 equivalents of calcium hydroxide at a temperature from above about 25° C. to the boiling point of said mixture.

References Cited by the Examiner

UNITED STATES PATENTS

| | | |
|---|---|---|
| 2,616,904 | 11/1952 | Asseff et al. |
| 2,902,448 | 9/1959 | Collins. |
| 2,961,403 | 11/1960 | Blumer _____ 252—33 |
| 3,027,325 | 3/1962 | McMillen et al. _____ 252—33 |

FOREIGN PATENTS

| | | |
|---|---|---|
| 605,743 | 9/1960 | Canada. |
| 774,683 | 5/1957 | Great Britain. |

DANIEL E. WYMAN, *Primary Examiner.*

R. E. HUTZ, P. P. GARVIN, *Assistant Examiners.*